United States Patent Office 3,463,183
Patented Aug. 26, 1969

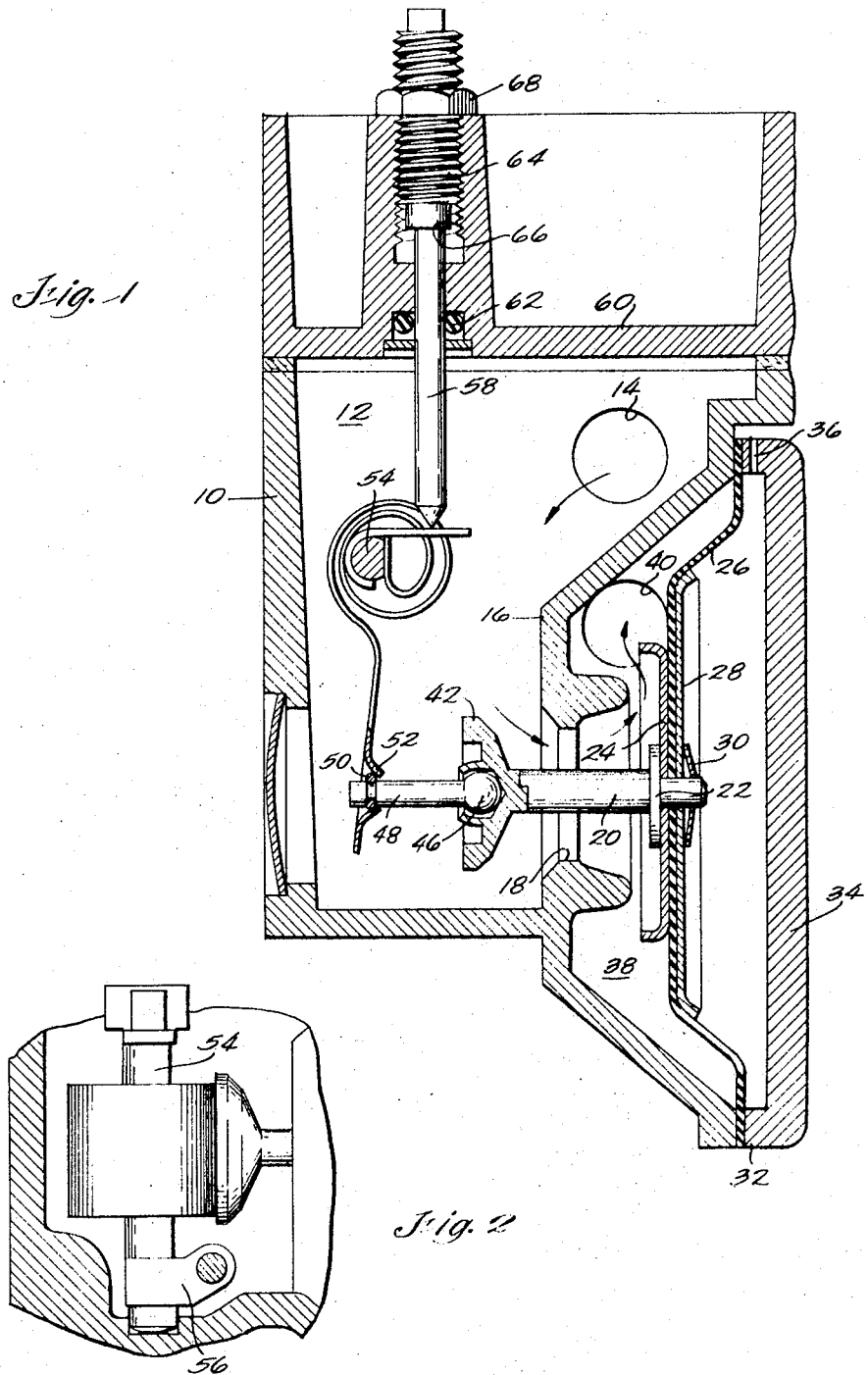

3,463,183
GAS PRESSURE REGULATOR HAVING ADJUSTABLE LATERALLY LOCATED CLOCK-TYPE BIASING SPRING
Elmer E. Wallace, Fullerton, Calif., assignor to Controls Company of America, Melrose Park, Ill., a corporation of Delaware
Filed June 27, 1967, Ser. No. 649,287
Int. Cl. F16k 31/145
U.S. Cl. 137—505.41                    3 Claims

ABSTRACT OF THE DISCLOSURE

The laterally located spiral wound (clock type) spring biases the pressure regulator and is adjustable by rotating the shaft supporting the spring.

Background of invention

Pressure regulators are customarily provided with coil springs aligned with the line of valve motion and adjustable by a device requiring access along the same line. This adds appreciably to the thickness of the regulator and the clearance which must be provided in the installation. To achieve smaller heating units the manufacturer now wants thin controls with all adjustments made from one side, usually the top. This has required a new approach to the design of the pressure regulator.

Summary of invention

A spiral or clock-type spring is used to bias the regulator and this achieves a significant reduction in the space required for the spring. Since the spring is located laterally of the axis of the regulator the thickness of the regulator can be reduced to a minimum. The clock spring is fixed on a shaft with one end engaging the regulator stem and the shaft is provided with a projecting tab against which an adjusting screw bears to determine the loading of the spring and the regulated pressure.

Description of drawings

FIG. 1 is a section through the regulator with suitable inlet and outlet ports schematically shown (schematic in the sense they are not located precisely in the positions shown in commercial unit).

FIG. 2 is a fragmentary view taken on line 2—2 in FIG. 1.

Description of preferred embodiment

FIG. 1 shows a valve housing 10 which is a vertical section through a control designed to minimize the width of the control and provide for adjustment of the regulator from above. The inlet chamber 12 receives gas from the usual safety controls and in the present drawing the inlet to chamber 12 is shown as a port 14. In the actual control the port is not exactly so located. The wall 16 is provided with a port 18 through which the stem 20 projects. The right hand of the stem is provided with a head 22 against which diaphragm pad 24 seats with the diaphragm 26 sandwiched between pad 24 and the outer pad 28, all of these being held in assembled position by means of the Belleville spring 30. The outer edge of the diaphragm is captured under seal 32 and cover plate 34. The cover plate is provided with a suitable pinhole vent 36 to admit atmospheric pressure to the right-hand side of diaphragm 26. The regulator chamber 38 is provided with an outlet 40.

The left end of the regulator stem 20 is provided with a valve portion 42 having an inner portion 44 spun over the ball head 46 of pin 48. At the left end of pin 48 a wire clamp ring 50 provides a simple bearing against which the punched and drawn end 52 of the clock spring 54 may bear. The inner end of the flat spiral wound or clock-type spring is fixed to shaft 54 the ends of which are suitably journaled in the housing as indicated in FIG. 2. Also fixed on the shaft 54 is a projecting finger or tab 56 against which the adjusting screw 58 bears. The screw 58 passes through the cover 60 through an O-ring seal with the threaded portion 64 threaded in well 66 with upper end accessible from above for turning the screw 58 for vertical adjustment, the adjusted position being held by means of lock nut 68. As the pin 58 moves up and down it will rotate shaft 54 within a limited range but this range is suitable for increasing or decreasing the preload of the spring 54 to adjust the bias applied through pin 48 to the regulator. It will be appreciated that the regulator operates in the normal fashion, that is, as the pressure in chamber 38 increases, the diaphragm moves to the right against the bias of the clock spring 54 to throttle down the amount of gas flowing through port 18. If the pressure starts falling, the reverse action occurs.

Since the clock spring is laterally disposed with respect to the axis of the pressure regulator it does not add to the overall length of the regulator assembly. Adjustment can be readily carried out from almost any angle with respect to the regulator merely by changing the disposition of the spring and the shaft axis relative to the regulator. In FIG. 1 it is readily visualized how the adjusting screw could be brought out either the right or left-hand side of the housing or be operable from below. It will be appreciated the spring assembly and its adjusting means could readily be placed to the right of the diaphragm.

It will be noted that in addition to the ball and socket connection between the pin 48 and valve 22 the wire clamp 50 cooperating with the punched and drawn portion 52 of the clock spring provides another type of ball and socket or universal connection to thereby largely mitigate the effect of the generally arcuate path of travel of the clock spring end where it engages the pin 48. This permits quite uniform motion of the valve 42 relative to the seat. It will be appreciated, however, that if the pressure conditions are such as to require the valve to closely approach the seat the cooperating conical surfaces between the valve and seat will tend to center the valve in that final motion.

I claim:
1. A pressure regulator comprising
   a housing having an inlet chamber and a regulator chamber with a port therebetween,
   a valve in the inlet chamber,
   a diaphragm in the regulator chamber and connected to the valve to move the valve in the closing direction as the pressure in the regulator chamber increases,
   a rotatable shaft positioned laterally of the axis of the valve and diaphragm having a projecting tab fixed thereon,
   a pin bearing on the tab and projecting through the housing for ease of access,
   a spiral wound flat spring having one end fixed on the shaft and its other end acting on the interconnected valve and diaphragm in opposition to the pressure acting on the diaphragm,
   said pin being adjustable to adjust the rotary position of the shaft and hence the regulated pressure.
2. A pressure regulator according to claim 1 in which the valve and diaphragm are interconnected by a stem and the spring acts on the stem through an intermediate pin having a ball and socket connection to the stem.
3. A pressure regulator according to claim 2 in which the spring and the intermediate pin are connected to allow relative angular motion therebetween as the valve is moved.

References Cited

UNITED STATES PATENTS

| 823,185 | 6/1906 | Miller | 251—337 XR |
|---|---|---|---|
| 869,878 | 11/1907 | Bruckner | 137—505.38 XR |
| 1,798,377 | 3/1931 | Joyce | 137—505.38 XR |
| 2,195,242 | 3/1940 | Dow | 137—494 |
| 2,293,956 | 8/1942 | Walthers | 251—337 XR |

HAROLD W. WEAKLEY, Primary Examiner

U.S. Cl. X.R.

267—1